United States Patent
Dittli

(10) Patent No.: US 8,857,609 B2
(45) Date of Patent: Oct. 14, 2014

(54) UNIT FOR SEPARATING A PRE-CUT SUBSTRATE POSITIONED DOWNSTREAM FROM A CUTTING UNIT

(75) Inventor: Oskar Dittli, Lausanne (CH)

(73) Assignee: Bobst Mex SA (CH)

( * ) Notice: Subject to any disclaimer, the term of this patent is extended or adjusted under 35 U.S.C. 154(b) by 276 days.

(21) Appl. No.: 13/515,531

(22) PCT Filed: Nov. 30, 2010

(86) PCT No.: PCT/EP2010/007240
§ 371 (c)(1),
(2), (4) Date: Jun. 13, 2012

(87) PCT Pub. No.: WO2011/072800
PCT Pub. Date: Jun. 23, 2011

(65) Prior Publication Data
US 2012/0291603 A1    Nov. 22, 2012

(30) Foreign Application Priority Data

Dec. 16, 2009    (EP) .................................... 09015556

(51) Int. Cl.
*B65G 47/26*    (2006.01)
*B26D 7/32*    (2006.01)
*B65H 29/16*    (2006.01)

(52) U.S. Cl.
CPC .......... *B65G 47/26* (2013.01); *B65H 2301/351* (2013.01); *B65H 2701/1764* (2013.01); *B65H 2402/60* (2013.01); *B26D 7/32* (2013.01); *B65H 2801/42* (2013.01); *B65H 2511/20* (2013.01); *B65H 29/16* (2013.01)
USPC ...................... 198/861.1; 198/861.2; 198/586

(58) Field of Classification Search
USPC ................. 198/436, 457.03, 462.3, 806, 817, 198/836.3, 861.1, 861.2, 586
See application file for complete search history.

(56) References Cited

U.S. PATENT DOCUMENTS

| | | | |
|---|---|---|---|
| 2,745,538 A * | 5/1956 | Lamb | 198/458 |
| 3,860,232 A | 1/1975 | Martin | |
| 4,846,336 A * | 7/1989 | Hoyland et al. | 198/432 |
| 5,368,643 A * | 11/1994 | Kuster | 118/324 |
| 6,012,568 A * | 1/2000 | Kane | 198/817 |
| 6,247,581 B1 * | 6/2001 | Oswald et al. | 198/812 |

(Continued)

FOREIGN PATENT DOCUMENTS

EP    1 195 335    4/2002

OTHER PUBLICATIONS

International Search Report dated Jan. 31, 2011 issued in corresponding international patent application No. PCT/EP2010/007240.

*Primary Examiner* — Douglas Hess
(74) *Attorney, Agent, or Firm* — Ostrolenk Faber LLP

(57) ABSTRACT

A unit for separating a pre-cut-out substrate into a plurality of separate sub-substrates (20). The unit includes upstream (2) and downstream (2a) transverse guides; conveyor ramps, which convey the pre-cut-out substrate and the separate sub-substrates (20), the ramps are slidably and pivotably mounted on the guides (4). Upstream and downstream locks holds each ramp (3) in a locked position. A movable element supports upstream and downstream unlocking devices for engaging the upstream and downstream locking devices to release the ramps (3). Upstream and downstream grasping devices grasp and drive the ramps (3) along the upstream (2) and downstream (2a) guides to arrange the ramps in a fan-like configuration.

13 Claims, 4 Drawing Sheets

(56) References Cited

U.S. PATENT DOCUMENTS

| | | |
|---|---|---|
| 6,427,097 B1 * | 7/2002 | Martin et al. .................. 700/230 |
| 6,471,050 B2 * | 10/2002 | Ikeda et al. ................. 198/861.1 |
| 6,769,534 B2 * | 8/2004 | Lee ............................... 198/817 |
| 7,068,521 B2 | 6/2006 | Kohjiro et al. |
| 7,416,073 B1 * | 8/2008 | Talken et al. .................. 198/806 |
| 7,721,876 B2 * | 5/2010 | Hartness et al. ........... 198/836.3 |
| 7,810,635 B2 * | 10/2010 | Kim et al. ...................... 198/817 |
| 8,413,791 B2 * | 4/2013 | Kennedy et al. ............... 198/597 |
| 8,540,071 B2 * | 9/2013 | Dowling .................... 198/861.1 |

* cited by examiner

UNIT FOR SEPARATING A PRE-CUT SUBSTRATE POSITIONED DOWNSTREAM FROM A CUTTING UNIT

CROSS REFERENCE TO RELATED APPLICATIONS

The present application is a 35 U.S.C. §§371 national phase conversion of PCT/EP2010/007240, filed Nov. 30, 2010, which claims priority of European Application No. 09015556.5, filed Dec. 16, 2009, the contents of which are incorporated by reference herein. The PCT International Application was published in the French language.

BACKGROUND OF THE INVENTION

The present invention concerns a unit for separating a pre-cut substrate into a plurality of separate sub-substrates. The separator unit is usable notably when positioned downstream of a cutting unit in a packaging production machine.

A packaging production machine is designed for the fabrication of boxes that form packaging after folding and gluing. In this machine, an initial continuous plane substrate, such as a plane web of cardboard, is unwound and is printed by a print unit, itself constituted of sub-units in the form of printing units. The web is then transferred into a cutting unit. After cutting, the substrates or blanks obtained have waste areas that are eliminated in a waste stripping unit.

A substrate or blank is composed of a plurality of sub-substrates or boxes. Depending on the type of cutting unit used, for example with a diecutting platen, the boxes are attached to each other by nicks. The nicks join two edges of a cutting line between two boxes and constitute bridges of the same material as the boxes and the blanks. With rotary die-cutting the boxes are juxtaposed.

The substrates or blanks are then separated in a separator unit or separator to obtain individual sub-substrates or boxes. This unit is designed to move the boxes transversely away from each other and/or if necessary to break the nicks, by conveying each of the boxes along a divergent trajectory. This trajectory is obtained by a fan-shaped orientation, i.e. one with divergent directions, of the conveyor ramps designed to convey the blanks from the outlet of the cutting unit to the outlet of the separator unit.

Because of this, the precut blanks leaving the cutting unit along a longitudinal series of adjacent parallel lines are reoriented by means of the conveyor ramps along a series of laterally spaced parallel lines so that two laterally adjacent boxes are no longer joined together. The individual boxes are then routed to a stacking unit for subsequent folding and gluing.

The ramps must be disposed on either side of a median longitudinal line of the blank. The number of ramps, the angle and the distance between the ramps in a plane corresponding to that of the blanks are chosen to enable optimum separation as a function of the layout, i.e. the disposition, of the boxes on the blank. The operator must quickly and simply modify the orientation and the position of the conveyor ramps for each new job. The operator must intervene in the centre center of the machine to adjust the ramps, which is not very ergonomic.

PRIOR ART

U.S. Pat. No. 3,860,232 describes a separator in which the orientation of the conveyor ramps is adjusted manually.

This operation is laborious and time-consuming, however. The downtime of the separator and thus of the whole machine that is used during manual adjustment of each of the ramps is reflected in the end in a serious loss of production. Moreover, in the above document, it is not possible to move the conveyor ramps laterally relative to each other.

There is also known from EP-1.195.335 a separator in which the orientation and the position of the conveyor ramps are adjusted automatically as a function of the job to be performed. Two towing assemblies each having a carriage are provided. Each of the carriages has engagement means designed to be engaged by a pin disposed on each of the conveyor ramps so that the carriage drives the conveyor ramp in its movement.

Optical identification of the positions of the engagement pins of the ramp to be moved accurately positions the two carriages in an initial engagement position. Computerized control coordinates the simultaneous movement of the two carriages toward the final position of the ramp. A common locking system is also provided to retain the ramps in position. The locking means are activated when the engagement means are disengaged from the corresponding pins.

By reason of the disposition of the carriage and the engagement means, the ramps must be arranged in a precise order, starting with the outermost ramp. Any new adjustment, in the event of a new job or in the event of an operator error, implies lateral stowage of all the ramps and then restarting of the two towing assemblies. Moreover, it is impossible to move a plurality of ramps at the same time, because the optical system is not able to identify a plurality of pin positions at the same time.

During movement of one of the conveyor ramps, the other conveyor ramps are no longer locked because of the common locking-unlocking. This is another drawback, because accidental movement of a correctly positioned conveyor ramp could occur during adjustment of the other conveyor ramps, leading to incorrect positioning of the boxes within the separator unit.

BRIEF DESCRIPTION OF THE INVENTION

A main objective of the present invention consists in developing a unit designed to separate a pre-cut substrate into a plurality of separate sub-substrates positioned downstream of a cutting unit for a packaging production machine. A second objective is to optimize the accuracy of the separation of the pre-cut substrates into separate individual sub-substrates. A third objective is to produce a separator unit enabling rapid adaptation to any new job. A fourth objective is to provide a separator unit provided with means for fast and easy adjustment of the number, angle and position of the ramps. A further fifth objective is that of obtaining a separator unit enabling the drawbacks of the prior art to be avoided. A further object is that of providing a packaging production machine with a cutting unit, a waste stripping unit and a separator unit.

The invention provides a unit designed to separate a pre-cut substrate into a plurality of separate sub-substrates, comprising:
  upstream transverse guide means and downstream transverse guide means,
  conveyor ramps adapted to convey the pre-cut substrate and the separate sub-substrates and mounted to slide and pivot on the upstream guide means and on the downstream guide means,
  means for moving and positioning the conveyor ramps along the upstream guide means and the downstream transverse guide means, and
  upstream locking means and downstream locking means able to maintain each of these conveyor ramps in a locked position relative to these upstream transverse guide means and the downstream transverse guide means.

According to one aspect of the present invention, the unit is characterized in that the moving and positioning means comprise a mobile element moving between said upstream transverse guide means and said downstream transverse guide means and carrying upstream unlocking means and downstream unlocking means able to cooperate with the upstream locking means and the downstream locking means to enable release of these conveyor ramps, and upstream and downstream grasping means adapted to grasp these conveyor ramps, so as to drive these conveyor ramps along these upstream transverse guide means and said downstream transverse guide means and to dispose them in a fan configuration.

In other words, the separator unit enables facilitated adjustment of the position and the orientation of the conveyor ramps thanks to a single mobile element. The separator unit also enables adjustment of the position and the orientation of one or more conveyor ramps with the other ramps remaining in their locked state. Because of the arrangement of the mobile element, it is possible to adjust the position of a single ramp without taking into account the position of the other ramps. The transverse movement and the angle of divergence of the ramps are thus effected ramp by ramp.

In another aspect of the invention, a packaging production machine is characterized in that it comprises the unit having one or more of the technical features described hereinafter and claimed, positioned downstream of a cutting unit and a waste stripping unit.

The upstream and downstream directions are defined with reference to the direction of movement of the substrate along the longitudinal direction in the separator unit and in the packaging production machine as a whole. The longitudinal direction is defined with reference to the direction of movement of the substrate in the separator unit and in the machine, along its longitudinal median axis. The transverse direction is defined as being the direction perpendicular to the direction of movement of the substrate.

BRIEF DESCRIPTION OF THE DRAWINGS

Other advantages and features of the present invention will be better understood on reading nonlimiting embodiments of the invention and with reference to the drawings, in which.

DETAILED DESCRIPTION OF PREFERRED EMBODIMENTS

Figure 1:
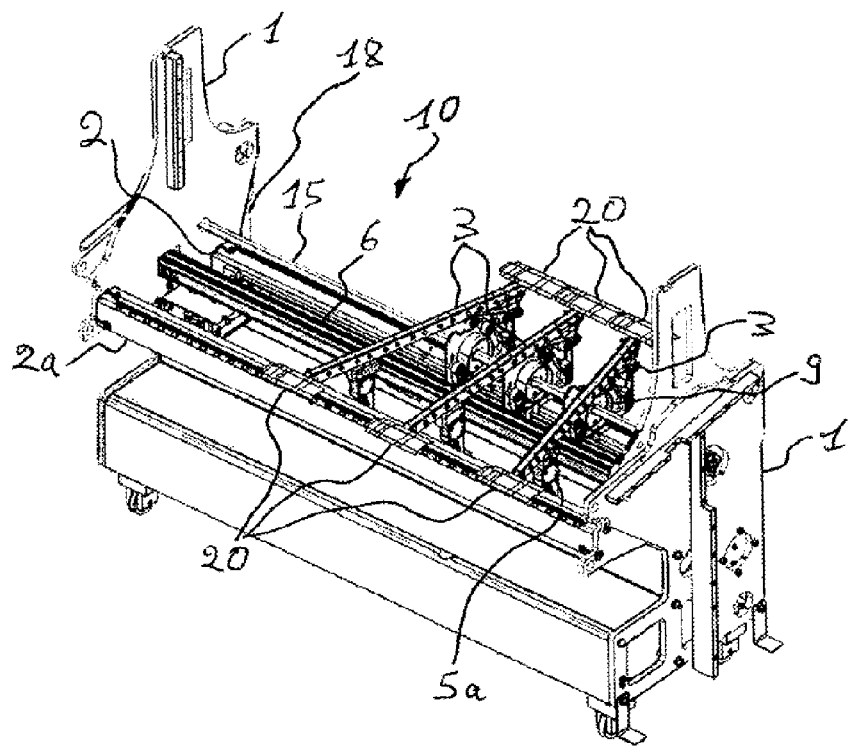
FIG. 1 is a perspective view of a separator unit of the invention.

A separator unit 10 is positioned downstream of a cutting unit and a waste stripping unit in a packaging production machine (not shown). As FIG. 1 shows, the unit 10 enables separation of substrates, i.e. pre-cut blanks in this case, into sub-substrates, i.e. individual boxes 20 in this case. These blanks and thus these boxes 20 are made of cardboard, for example.

The unit 10 is designed to receive a stream of rows of adjacent boxes 20. In this embodiment, the boxes 20 leave the cutting unit still joined to each other by small bridges of material. The boxes 20 leave the separator unit 10 separated from each other.

The production machine may then include an alignment module (not shown) positioned downstream of the unit 10 to straighten the boxes 20 and place them along a plurality of longitudinal parallel lines. The boxes 20 are then shingled in a stream unit (not shown) positioned downstream of the unit 10.

The blanks initially all move in the longitudinal direction from a delivery upstream end of the unit 10. The unit 10 then moves these blanks to a supply downstream end by means of a plurality of conveyor ramps 3 disposed in front of each of the rows of boxes 20. These conveyor ramps 3 are adapted to convey the pre-cut substrate and the separated sub-substrates.

These ramps 3 have divergent orientations in a fan arrangement so as to separate the rows of boxes 20 from each other. To adjust the oblique orientation of the ramps 3, the unit 10 includes upstream linear guide means 2 (see FIGS. 1 to 9) and downstream linear guide means 2a (see FIGS. 2 to 9). The ramps 3 are mounted so as to slide and to pivot on the upstream guide means 2 and the downstream guide means 2a. These guide means 2 and 2a are attached at their two ends to a chassis 1 of the unit 10. The guide means 2 and 2a are substantially transverse and parallel to each other.

Figure 2:
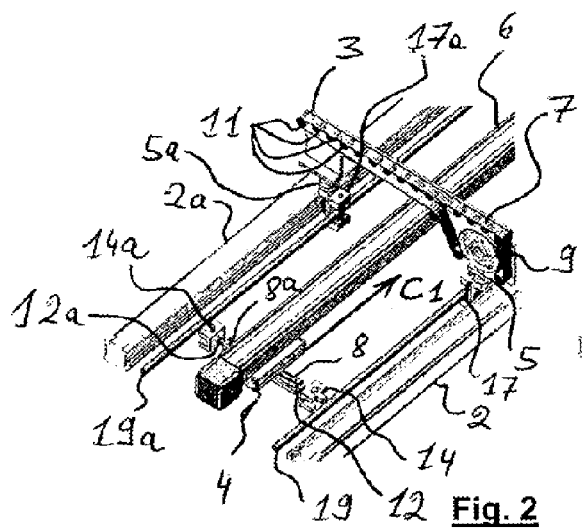
FIGS. 2 to 9 are partial views in perspective of a conveyor ramp and moving and positioning means, showing the various steps of moving and positioning the ramp.
Figure 3:
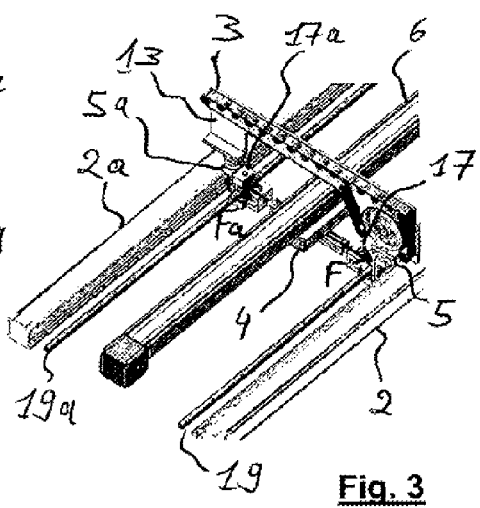

In order to move the boxes 20 from the delivery end to the supply end, each of the ramps 3 includes at least one drive belt 7 mounted on a plurality of guide rollers 11 (see FIG. 2). The belt 7 is driven by a main drive pulley 9. Only the lower ramps 3 have been represented in FIG. 1. To each of the lower ramps 3 there corresponds an upper ramp, the boxes being held in a pinch area between the belt 7 of a lower ramp 3 and a belt of an upper ramp.

The assembly formed by the belt 7, the pulley 9 and the rollers 11 is supported by a support frame 13. The upstream end 5 and the downstream end 5a of the support frame 13 are mounted so as to slide and to pivot on the upstream guide means 2 and the downstream guide means 2a, respectively.

The belt 7 has a flat contact surface so as to facilitate movement of the boxes 20. The pulley 9 is plugged into a transverse drive shaft 15. The pulley 9 is driven in rotation by the transverse drive shaft 15, which is common to all the ramps 3. The shaft 15 is mechanically connected to a drive motor. The pulley 9 is mobile transversely in translation along this shaft 15. Thus the ramps 3 remain mobile in translation along this shaft 15.

The unit 10 then comprises means for moving and positioning the ramps 3 in a fan configuration along the upstream guide means 2 and the downstream guide means 2a. These moving and positioning means take the form of a mobile element or carriage 4.

According to the invention, the carriage 4 moves along a central transverse rail 6 disposed between and parallel to the upstream guide means 2 and the downstream guide means 2a. The rail 6 may be disposed equidistantly between the upstream guide means 2 and the downstream guide means 2a. In a preferred embodiment of the invention, the carriage 4 is actuated by a toothed belt disposed inside the rail 6 and a drive motor.

According to the invention, the carriage 4 carries the unlocking means. These unlocking means comprise an upstream cylinder 8 directed longitudinally toward the delivery end, i.e. in the upstream direction, and a downstream cylinder 8a directed longitudinally toward the supply end, i.e. toward the downstream end. The upstream cylinder 8 and the downstream cylinder 8a each include and actuate an upstream mobile piston rod 12 and a downstream mobile piston rod 12a, respectively. An upstream bearing member 14 and a downstream bearing member 14a are attached to the free end of the upstream piston rod 12 and the downstream piston rod 12a, respectively.

The ramps 3 comprises upstream locking means 17 and downstream locking means 17a able to maintain the ramps 3 in a particular position enabling immobilization at will of these ramps 3 on the upstream guide means 2 and the downstream guide means 2a, respectively. The locking means 17 and 17a are disposed at the ends 5 and 5a, respectively, of the support frame 13 of the ramps 30. The locking means 17 and 17a are designed to prevent movement of these ends 5 and 5a along the guide means 2 and 2a.

The upstream and downstream unlocking means are able to cooperate with the upstream locking means 17 and the downstream locking means 17a to enable releasing of the ramps 3 so as to drive them along said upstream guide means 2 and said downstream guide means 2a and to dispose them in a fan configuration. The cylinders 8 and 8a with their piston rods 12 and 12a and their bearing members 14 and 14a are used to unlock the locking means 17 and 17a.

Referring to FIGS. 2 to 9, there are represented the successive steps of moving one of the conveyor ramps 3. The ramp 3 goes from an initial position aligned with the longitudinal direction to a final position shifted laterally and diverging at an angle to the longitudinal direction. The unit 10 may include a parking area or volume 18 for one or more unused ramps, situated in the vicinity of the chassis 1.

In a first position (see FIG. 2), the ramp 3 is stowed in the parking area 18 of the unit 10. One or more ramps not used for the current job remain waiting during the time to adjust the position of the ramp 3 and/or during the job time for separation.

In this first position, the ramp 3 is aligned with the longitudinal direction. The ramp 3 is locked in position by the upstream guide means 2 and the downstream guide means 2a by its upstream end 5 and its downstream end 5a. For its part, the carriage 4 is initially positioned at the end of the rail 6. The piston rods 12 and 12a are fully retracted into the cylinders 8 and 8a. The ramp 3 is then moved toward its operating position.

In a second position (see FIG. 3), the carriage 4 is moved (arrow C1 in FIG. 2) along the rail 6 so as to position the bearing members 14 and 14a in front of the ends 5 and 5a.

In a third position (see FIG. 4), the cylinders 8 and 8a are actuated (arrows F and Fa in FIG. 3) to deploy the piston rods 12 and 12a in the direction of the ends 5 and 5a. In this new position of the piston rods 12 and 12a, each of the ends 5 and 5a is unlocked by means of the bearing members 14 and 14a. Moreover, engagement elements integrated to the bearing members 14 and 14a are arranged so as to grasp these ends 5 and 5a. Because of this, in this upstream and downstream unlocked position, the ramp 3 remains joined to, being hooked to the carriage 4 during its lateral movements.

In a fourth position (see FIG. 5), the carriage 4 is moved laterally (arrow C2 in FIG. 4) along the rail 6. The carriage 4 drives transversely in its movement the ramp 3 that has remained in its upstream and downstream unlocked position because of the action of the cylinders 8 and 8a. In this new transverse position, the ramp 3 remains aligned with the longitudinal direction.

Figures 4, 5:
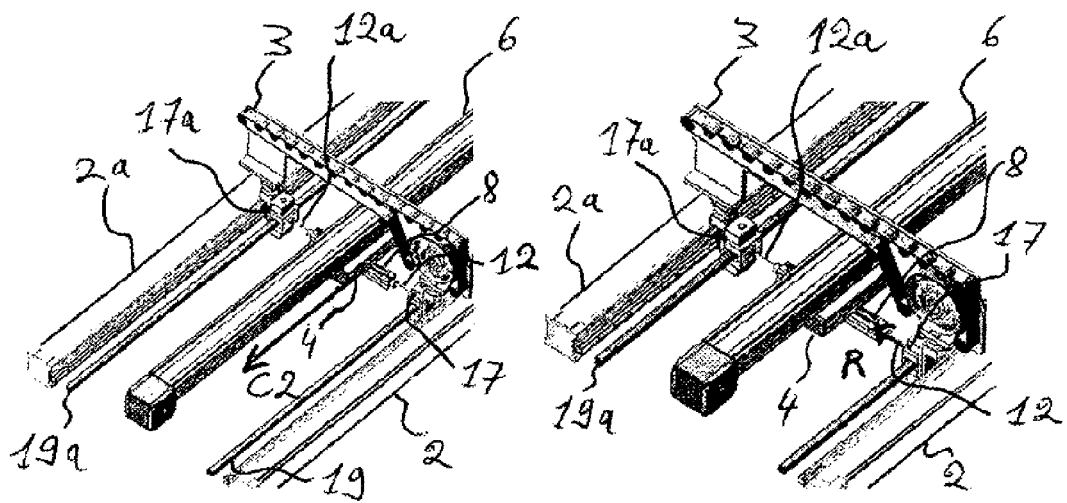
Figure 10:
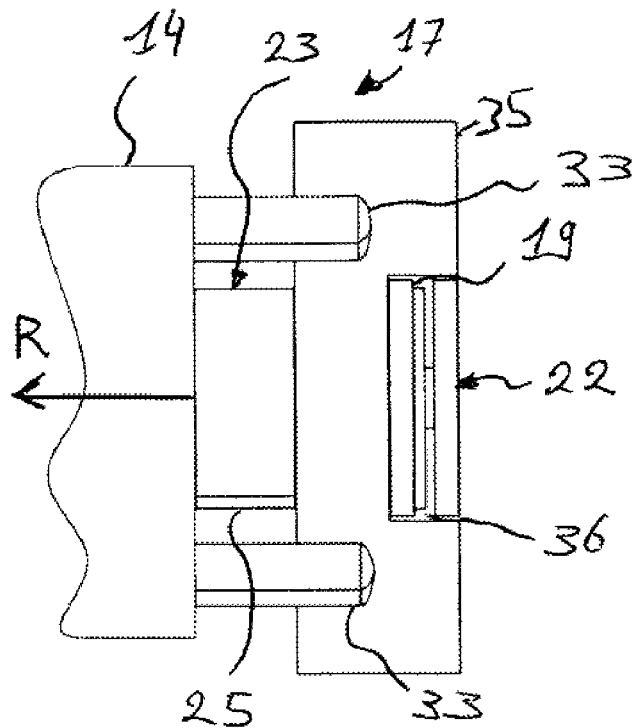
FIG. 10 is a sectional view of the locking means in the locked position of a ramp.
Figure 11:
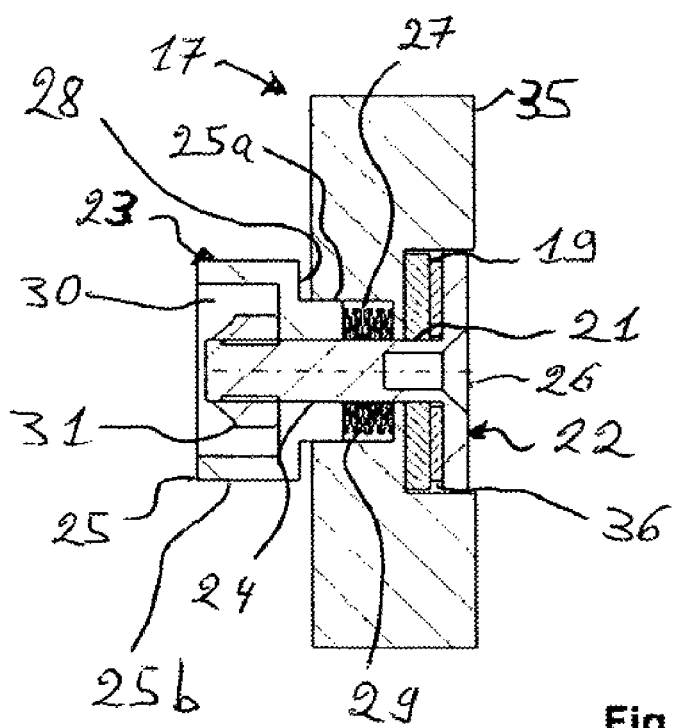
FIG. 11 is a lateral view of the locking means and the unlocking means in the unlocked position of a ramp.
Figure 12:
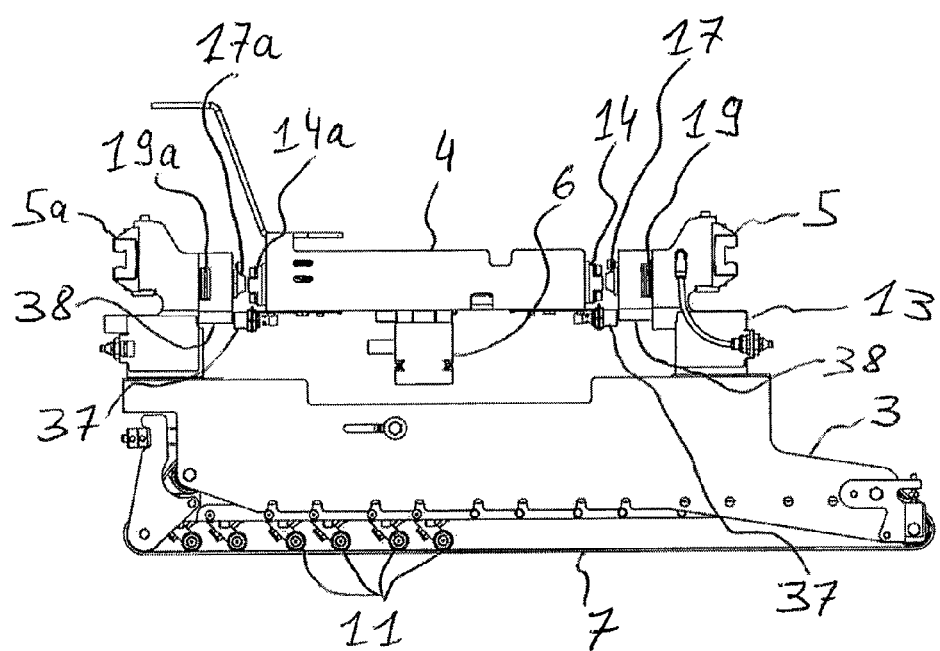
FIG. 12 is a lateral view of a conveyor ramp and moving and positioning means.

In a fifth position (see FIG. 6), the cylinder 8 is actuated so as to retract the upstream piston rod 12 in the direction of the rail 6 (arrow R in FIGS. 5 and 10). In this transverse position, the upstream end 5 is locked again.

Figures 6, 7:
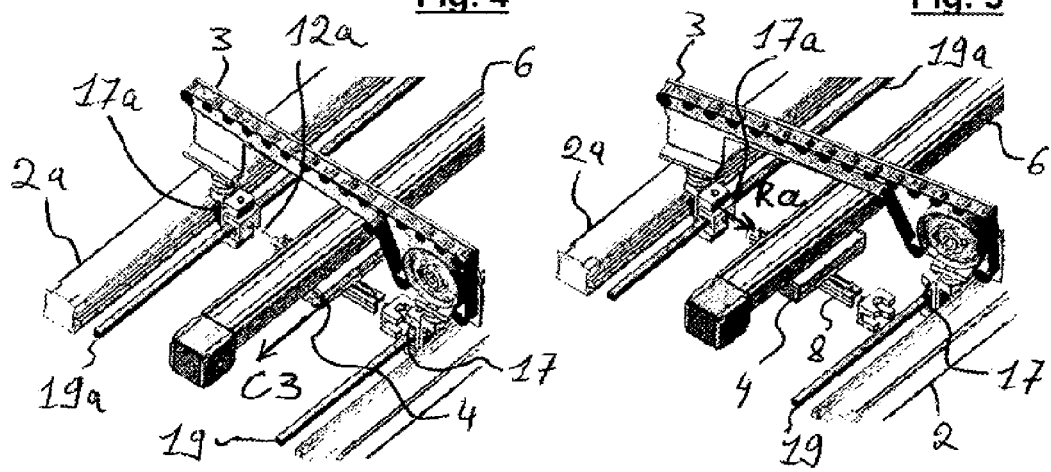
Figures 8, 9:
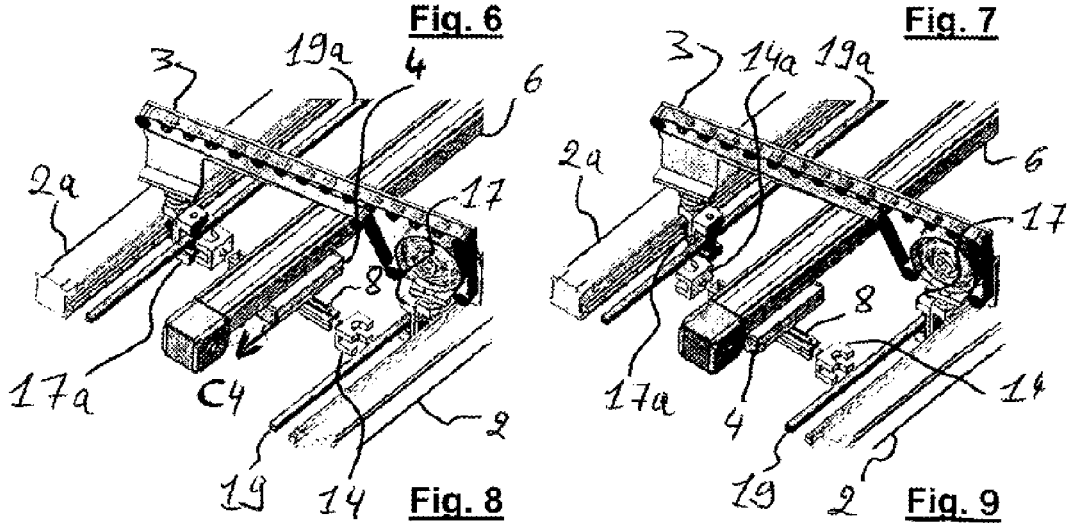

In a sixth position (see FIG. 7), the carriage 4 is moved laterally along the rail 6 (arrow C3 in FIG. 6). As it moves the carriage 4 drives only the downstream end 5a, because of its unlocked position, but not the upstream end 5, because of its locked position. In this transverse position, the ramp 3 is inclined relative to the longitudinal direction. This position corresponds to the final position of the ramp 3.

In a seventh position (see FIG. 8), the cylinder 8 is actuated to retract the piston rod 8a in the direction of the rail 6 (arrow Ra in FIG. 7). In this transverse position the downstream end 5a is locked again. Because of the distance between the downstream end 5 and the upstream end 5a, the ramp 3 is locked in an oblique divergent position.

In an eighth position (see FIG. 9), the carriage 4 is moved laterally along the rail 6 (arrow C4 in FIG. 8), so as to return to its initial position at the end of the rail 6.

In this way, one and the same carriage 4 moves and positions adequately, one after the other, all of the ramps 3 to be used for the envisaged separation job. This movement procedure may be adapted to other initial or final positions of the ramp 3 or the carriage 4.

The steps referred to above may be carried out in the reverse order so as to move the ramp 3 from its final position to its initial position. Using a similar principle to move the ramp 3 from one oblique position to another oblique position may also be envisaged. This principle consists notably in first moving the ramp 3 into a position aligned with the longitudinal direction, before moving the ramp 3 laterally, and then again orienting this ramp 3 in an oblique direction.

As may be seen in FIGS. 1 to 11, the upstream locking means 17 and the downstream locking means 17a are formed on the one hand by a slide taking the form of upstream downstream transverse rigid blade 19 and downstream transverse rigid blade 19a, attached to the chassis 1. The blades 19 and 19a are substantially parallel to the upstream guide means 2 and the downstream guide means 2a and to the rail 6. These blades 19 and 19a each have an oblong central opening 21 (visible in FIG. 11).

The interior is defined as being the area between the two guide means 2 and 2a. The exterior is defined as being the upstream and downstream areas outside the guide means 2 and 2a.

The locking means 17 and 17a are formed on the other hand with exterior fixing means 22 and interior fixing means (see FIGS. 10 and 11), joined to the ramps 3. The exterior fixing means 22 and the interior fixing means 23 cooperate with the corresponding blade 19. The opening 21 enables the fixing means 22 and 23 to be passed on each side of the blades 19 and 19a.

The ends 5 and 5a of the support frame 13 of the ramp 3 each comprise upstream and downstream extensions 35 joined to the ramp 3. The extensions 35 are situated at the point of pivoting and sliding on the upstream guide means 2 and the downstream guide means 2a. The fixing means 22 and 23 are positioned on either side of the blade 19 and on either side of the extension 35. This extension 35 includes a groove forming a rectangular profile sliding housing 36 inside which the exterior fixing means 22 and the blade 19 are positioned.

In the locked position of the upstream end 5, the blade 19 is strongly clamped between the exterior fixing means 22 and a lower face of the wall of the housing 36. This extension 35 is provided with an orifice 27 inside which the fixing means 23 slide.

The exterior fixing means 22 are formed of a mobile axis 24 passing through the oblong opening 21 of the blade 19. The axis 24 is extended at an exterior end by a flat mobile head 26. The head 26 is positioned on an exterior side of the blade 19 and clamps this blade 19 against the interior face of the wall of the housing 36 for locking purposes. The axis 24 and the head 26 are operated by the interior fixing means 23 disposed on the other side of this blade 19.

The interior fixing means 23 are formed of a mobile actuator element or pusher 25 throughout the length of which extends a central hole receiving an interior end of the axis 24. The pusher 25 has a tubular first part 25a sliding inside the cavity 27. This first part 25a is pushed back toward the interior and out of this cavity 27 by means of a compression spring 29 disposed at the bottom of the cavity 27.

The pusher 25 has a second tubular part or button 25b having a bearing rim 28 configured to abut against the extension 35 in the unlocked position. This button 25b has an interior recess 30 at its free end in which is positioned a nut 31 screwed onto the interior end of the axis 24.

The upstream fixing means 22 and the downstream fixing means 23 are symmetrical to each other and enable locking and unlocking at will of the upstream end 5 and the downstream end 5a to the upstream blade 19 and the downstream blade 19a, respectively.

In the unlocked position (see FIG. 10), by virtue of the action of the piston rod 12 of the cylinder 8, the bearing member 14 pushes back the pusher 25 by bearing on the button 25b. The button 25b is thus pushed back against the extension 35. The button 25b drives the first part 25a against the compression spring 29. The first part 25a slides and enters the cavity 27. The first part 25a drives the axis outward through the oblong opening 21 of the blade 19. Consequently, the head 26 of the axis 24 therefore no longer bears on the blade 19.

To drive the extension 35, and consequently the ends 5 and 5a of the ramp 3 in their lateral movement along said upstream guide means 2 and downstream guide means 2a and to dispose them in a fan configuration, the carriage 4 comprises in accordance with the invention upstream and downstream grasping means. These grasping means are formed of a plurality of lugs 33 disposed in the vicinity of the bearing members 14 and 14a. The bearing member 14 is provided on its lateral edges with fixing lugs 33. These lugs are configured to be positioned around the pusher 25 on either side of the extension 35 when the bearing member 14 moves toward and then pushes the pusher 25.

The separator unit 10 as described above may be operated manually by an operator or may function automatically.

This movement may be effected either under the manual control of an operator or automatically. In the latter case, it is preferable to integrate detection means on the carriage 4 adapted to detect the presence of marker means on the conveyor ramps 3. These detector means are inductive detectors 37, for example, able to detect the presence of a metal part 38 disposed at a short distance. The detection means 37 are used to align the unlocking means of the carriage 4 with the locking means 17 and 17a of the ramps 3 by accurately controlling the driving of the carriage 4.

Computerized control means are provided for controlling automatically the movement of the carriage 4 and the cylinders 8 and 8a. This automatic control may be effected as a function of data stored beforehand in the computer, namely the dimensions of the boxes 20, the number of ramps 3, the initial position of the ramps 3 relative to the boxes 20 or the lateral spacing between the boxes 20 at the supply end. Such automatic control is effected as a function of information received from the detector means detecting the position of the ramps 3 and the carriage 4.

The present invention is not limited to the embodiments described and shown. Numerous modifications may be made without departing from the framework defined by the scope of the claims.

The invention claimed is:

1. A separating unit for separating a movable substrate into a plurality of separate sub-substrates during movement through the unit, the unit comprising:
   an upstream guide device located upstream in a path of the substrate and the sub-substrates through the unit, a downstream guide device downstream in the path of the substrate and the sub-substrates, the guide devices extending transversely across the movement direction of the substrate and sub-substrates through the unit;
   a plurality of substrate and sub-substrate conveyor ramps extending between the upstream and downstream guide devices, each ramp being mounted to slide along and pivot on the upstream and downstream guide devices, the conveyor ramps being configured and operable to convey the substrate and separated sub-substrates from upstream to downstream through the unit;
   a ramp moving and positioning device selectively connectable to each of the ramps and when the ramp moving device is connected to one of the ramps, the ramp moving device is configured and operable to move the one ramp transversely selectively along at least one of the upstream and downstream guide devices for positioning the one ramp transversely of the path of the substrate and the sub-substrates, wherein the moving and positioning device comprises a movable element which moves transversely of the path of the substrate and the sub-substrates;
   a respective upstream and downstream locking device configured and operable to maintain each of the ramps in a respective locked position relative to the upstream and downstream guide devices;
   the ramp moving and positioning device further including an unlocking device configured to cooperate with the upstream and downstream locking devices for releasing the ramps for moving transversely of the path of the substrate and sub-substrates; and
   upstream and downstream grasping devices configured and operable to grasp each of the ramps for driving that ramp along at least one of the upstream and downstream guide devices to a selected orientation of the ramp with respect to the path of the substrate and sub-substrates.

2. The unit of claim 1, wherein the moving and positioning device comprises a mobile element located between the upstream and downstream guide devices and being movable transversely to the path of the substrate.

3. The unit of claim 1, wherein the moving and positioning device including the grasping device thereof is configured to drive the ramps along the upstream and downstream guide devices for selectively disposing the ramps in a fan configuration wherein the ramps are increasingly separated in the transverse direction, moving along the downstream path through the unit.

4. The unit of claim 3, further comprising the grasping device being comprised of a plurality of lugs disposed in a vicinity of the bearing member, and each lug is configured to be positioned around the mobile actuator element.

5. The unit as claimed in claim 1, wherein the upstream and downstream locking devices respectively comprise an upstream and downstream slide, each slide being substantially parallel to the upstream and downstream guide devices; and upstream and downstream fixing devices joined to each ramp and cooperating with the slide and configured and operable to selectively fix the positions of the ramps on the slide.

6. The unit as claimed in claim 5, wherein the fixing device comprises a mobile actuator element selectively clamped to the slide and maintained to an attached part joined to the ramps.

7. The unit of claim 6, wherein the upstream and downstream unlocking devices are formed with respective upstream and downstream rods and respective upstream and downstream cylinders configured for the rods to move in and out of the cylinders, the cylinders are configured and operable for moving the rods;

each rod including a free end carrying a bearing member which is configured and operable to bear on the mobile actuator element.

8. The unit of claim 6, further comprising a central rail between the upstream and downstream guide devices and along which the moving and positioning device is movable.

9. The unit of claim 1, further comprising a toothed belt and a motor driving the belt, the tooth belt being connected with the moving and positioning device for moving it transversely of the path of the substrate and the sub-substrates.

10. The unit of claim 1, further comprising a detector in the moving and positioning device to detect the presence of a marker on each of the ramps, and the detector being operable to cause the ramp grasping device to align the unlocking device of the moving and positioning device with the locking device of the ramps.

11. The unit of claim 1, further comprising a parking area for at least one ramp not being operated to move the substrate.

12. A packaging production machine including a unit as claimed in claim 1 for separating a substrate into sub-substrates, the machine including a cutting unit for cutting the substrate into sub-substrates and a waste stripping unit, wherein the separating unit is downstream of the cutting unit and the waste stripping unit.

13. The machine of claim 12, further including an alignment module downstream of the separating unit.

* * * * *